J. G. SABO.
CUP WASHER EXPANDER.
APPLICATION FILED NOV. 5, 1920.
1,389,222.
Patented Aug. 30, 1921.
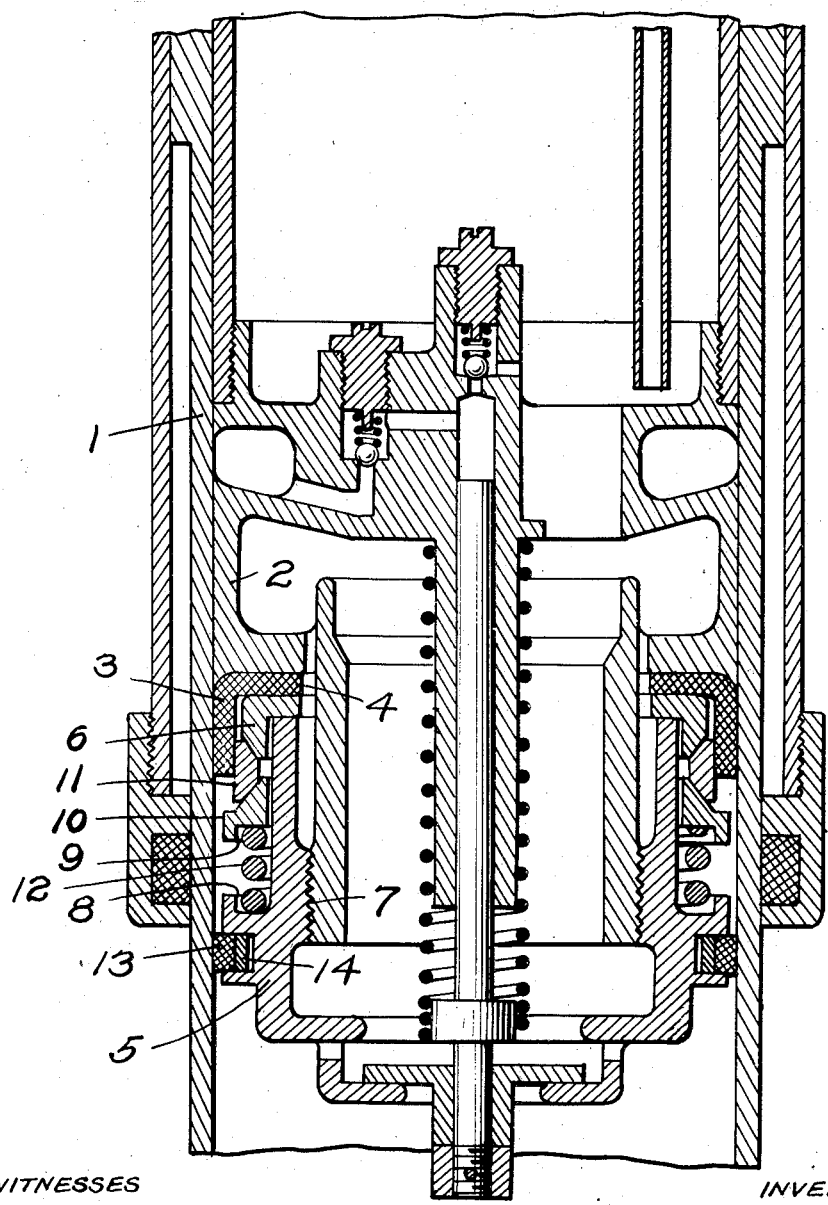

UNITED STATES PATENT OFFICE.

JULIUS G. SABO, OF NEW HAVEN, CONNECTICUT, ASSIGNOR TO WESTINGHOUSE AIR SPRING COMPANY, A CORPORATION OF PENNSYLVANIA.

CUP-WASHER EXPANDER.

1,389,222.      Specification of Letters Patent.      Patented Aug. 30, 1921.

Application filed November 5, 1920. Serial No. 422,103.

*To all whom it may concern:*

Be it known that I, JULIUS G. SABO, a citizen of the United States, and a resident of New Haven, in the county of New Haven and State of Connecticut, have made a new and useful Improvement in Cup-Washer Expanders, of which the following is a specification.

My invention relates to vehicle air springs of the type shown in Westinghouse Patent No. 1,036,043, and consists in a novel expander for the plunger-cup washer.

It is essential for the efficient operation of these springs that the cup washer fit snugly against the cylinder wall at all times.

The object of this invention is to provide internal pressure on the cup washer to hold it against the cylinder wall irrespective of wear or work.

The accompanying drawing illustrating my invention shows a vertical section through that portion of an air spring in which the plunger operates, and in this drawing 1 indicates the cylinder wall, 2 the plunger body and 3 the cup washer which is seated against the face 4 of body 2 by pressure of a nut 5, against the cup-washer plate 6. Nut 5 is threaded onto the plunger at 7 and is provided with an upwardly facing annular recess 8.

Opposing recess 8 and spaced therefrom is the recess 9 in a follower 10 located below plate 6. The opposing faces of follower 10 and plate 6 are oppositely beveled to form an adjustable seat for a split ring 11 which bears against washer 3.

A coil spring 12 is compressed between recesses 8 and 9 and tends to force follower 10 toward plate 6. This tendency causes ring 11 to act as a wedge between plate 6 and washer 3, thrusting the latter against the cylinder wall 1. Split ring 11 is preferably provided with a lap joint at its split portion. Below recess 8, nut 5 is provided with a supplemental packing 13 provided with the usual ring 14.

My expander provides a more endurable, even pressure on the cup washer and facilitates assembly and disassembly of the plunger and cylinder. By varying the size or coils of spring 12 the pressure against the cup washer may be increased or decreased as desired. The device is economical in cost and efficient in operation.

Ring 11 may be replaced by a single ring of round wire or by two or more coils tightly wound. I contemplate such change and the usual other modifications likely to be suggested in the commercial development of my expander.

I claim as my invention:

1. In an expander for a cup washer, a split ring adapted to be expanded transversely of the axis of the washer, a member adapted to be moved parallel with said axis and provided with a cam surface adapted to expand said ring, and a yielding element tending to move said member as mentioned.

2. An expander for a cup washer including a washer plate having an outwardly beveled face, a split expanding ring seated on one edge of said face, a follower engaging the opposite edge of said ring and a spring tending to thrust said follower toward said beveled face on said plate.

3. An expander for a cup washer including a washer plate, a split expanding ring seated on one edge of said plate, a follower having a beveled face engaging the opposite edge of said ring and a coiled spring tending to thrust said follower toward said plate.

4. In an expander for a cup washer, a split ring adapted to bear against the inner surface of said washer to press outwardly thereon, elements having opposed converging surfaces, adapted to move toward each other to expand said ring and means tending to thrust said elements toward each other.

5. In combination with an air-spring plunger having a washer seat, a cup washer seated thereon and having a flexible depending portion, a split ring adapted to be expanded against said washer portion, a follower adapted to be moved toward said seat and in so moving to expand said ring, a member adapted to be screwed on the plunger and to secure said washer on its seat and provided with a flange spaced from said follower, and a coil spring compressed between said flange and said follower.

In testimony whereof, I have hereunto subscribed my name this 22nd day of October, 1920.

JULIUS G. SABO.